(12) United States Patent
Cheng et al.

(10) Patent No.: US 11,995,427 B2
(45) Date of Patent: May 28, 2024

(54) METHOD, APPARATUS, DEVICE, AND STORAGE MEDIUM FOR UPGRADING VEHICLE-MOUNTED TBOX

(71) Applicant: ZTE CORPORATION, Guangdong (CN)

(72) Inventors: Fei Cheng, Guangdong (CN); Lei Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 453 days.

(21) Appl. No.: 17/292,002

(22) PCT Filed: Nov. 6, 2019

(86) PCT No.: PCT/CN2019/116025
§ 371 (c)(1),
(2) Date: May 6, 2021

(87) PCT Pub. No.: WO2020/094065
PCT Pub. Date: May 14, 2020

(65) Prior Publication Data
US 2021/0294593 A1    Sep. 23, 2021

(30) Foreign Application Priority Data
Nov. 7, 2018  (CN) .......................... 201811316169.2

(51) Int. Cl.
*G06F 11/14*    (2006.01)
*G06F 8/65*    (2018.01)
(Continued)

(52) U.S. Cl.
CPC .............. *G06F 8/65* (2013.01); *G06F 9/445* (2013.01); *G06F 11/1433* (2013.01); *G07C 5/0808* (2013.01)

(58) Field of Classification Search
CPC ...... G06F 11/1433; G06F 8/65; G07C 5/0808
See application file for complete search history.

(56) References Cited

U.S. PATENT DOCUMENTS

2010/0114853 A1* 5/2010 Fisher .................. G11B 27/034
709/219
2014/0325043 A1* 10/2014 Pan .......................... H04L 67/34
709/221
(Continued)

FOREIGN PATENT DOCUMENTS

CN         107632862 A       1/2018
WO         2018070156 A1     4/2018

OTHER PUBLICATIONS

International search report of PCT Patent Application No. PCT/CN2019/116025 dated Jan. 23, 2020.
(Continued)

*Primary Examiner* — Jigar P Patel
(74) *Attorney, Agent, or Firm* — NZ CARR LAW OFFICE

(57) ABSTRACT

A method, apparatus, device, and a storage medium for upgrading a vehicle-mounted Tbox, which relate to the technical field of vehicle-mounted Tbox. The method comprises: when using a BOOTLOADER1 module that is used to store a power-on initial code for power-on startup, a vehicle-mounted Tbox determines whether version upgrading needs to be carried out (S401); and when it is determined that version upgrading needs to be carried out, the vehicle-mounted Tbox sequentially carries out version upgrading on a BOOTLOADER2 module for storing control logic and a diagnostic protocol stack code and app module (S402).

7 Claims, 8 Drawing Sheets

(51) Int. Cl.
*G06F 9/445* (2018.01)
*G07C 5/08* (2006.01)

(56) References Cited

U.S. PATENT DOCUMENTS

2014/0375579 A1* 12/2014 Fujiwara ................ G06F 3/041
345/173
2017/0195459 A1* 7/2017 e Costa ................ H04L 67/025
2019/0018669 A1* 1/2019 Cook ................ G06F 16/2365

OTHER PUBLICATIONS

Examination Report of Counterpart European Patent Application No. 19882258.7 dated Mar. 22, 2023.

* cited by examiner

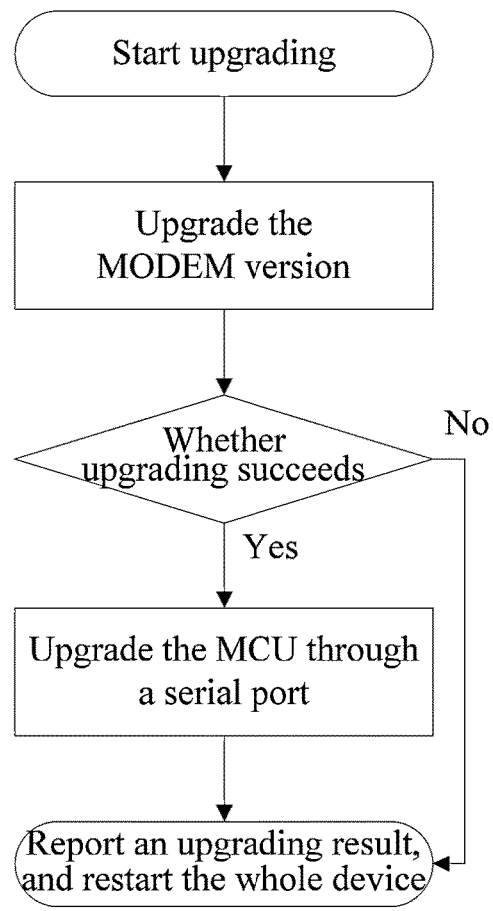

Fig. 3

| Determine, by a vehicle-mounted Tbox, when using a BOOTLOADER1 module that is used to store a power-on initial code for power-on startup, whether version upgrading needs to be carried out | ⟵ S401 |

| Carry out, by the vehicle-mounted Tbox, when it is determined that version upgrading needs to be carried out, sequentially version upgrading on a BOOTLOADER2 module for storing control logic and a diagnostic protocol stack code and an APP module | ⟵ S402 |

Fig. 4

METHOD, APPARATUS, DEVICE, AND STORAGE MEDIUM FOR UPGRADING VEHICLE-MOUNTED TBOX

CROSS-REFERENCE TO RELATED APPLICATIONS

The present disclosure claims the priority of Chinese patent application CN 201811316169.2, entitled "Method, Apparatus, Device, and Storage medium for Upgrading Vehicle-mounted Tbox" and filed on Nov. 7, 2018, the entirety of which is incorporated herein by reference.

FIELD OF THE INVENTION

The present disclosure relates to the technical field of vehicle-mounted Tbox (Telematics Box), and in particular, to a method, apparatus, device, and storage medium for upgrading a vehicle-mounted Tbox.

BACKGROUND OF THE INVENTION

A vehicle-mounted Tbox is part of a telematics system, and is in charge of functions including bus data collection, data reporting, and network services of a vehicle CAN (controller area network). The vehicle-mounted Tbox is a pre-mounted product. That is, the vehicle-mounted Tbox is pre-mounted inside a vehicle before the vehicle leaves the factory. Therefore, in a case that the vehicle-mounted Tbox fails to start up due to quality problems, a user cannot deal with it by himself/herself, and the vehicle may only be returned to a 4S shop for maintenance. Therefore, there is a high demand for reliability of this product, and a circumstance that the vehicle-mounted Tbox fails to work should be avoided in any case. Since a vehicle-mounted Tbox product supports a networking function, when a deficiency occurs in the Tbox product and thus it needs to update the software, bugs can be repaired by way of FOTA (firmware over-the-air) upgrading. Considering the demand for reliability mentioned above, the whole upgrading process must be safe and reliable, and failing to start up due to upgrading is not allowed.

Seen from the software architecture, the Tbox adopts a manner of MCU (microcontroller unit)+MODEM. The system diagram of the Tbox is shown in FIG. 1. The MCU is mainly in charge of CAN bus data collection and peripheral circuit control, and the MODEM is mainly in charge of functions including network services, interaction with the background system, and the vehicle's multimedia. The FOTA upgrading solution of the MODEM is relatively mature, adopting an incremental upgrading solution and supporting resuming upgrading from a breakpoint. However, the MCU part only supports full-version upgrading, and if abnormal termination occurs during upgrading, it may lead to a circumstance that the device fails to start up and cannot be used.

Vehicle-mounted MCUs basically adopt a solution of BOOTLOADER+APP. The BOOTLOADER is in charge of functions including base initialization, startup process control, and diagnosis, and the APP is in charge of upper layer business logic. As shown in FIG. 2, details are as follows.
(1) Power-on startup is carried out, and the MCU loads a BOOTLOADER image; and the process jumps to execution.
(2) Base resources are initialized in BOOTLOADER1, and the APP is loaded.
(3) It is determined whether the APP is valid. The process jumps to the APP if the APP is valid, and the process stays in the BOOTLOADER and run the diagnostic protocol stack if the APP is not valid.

Since the diagnostic protocol stack is integrated in the BOOTLOADER, it is required to reserve enough storage space, otherwise the BOOTLOADER image cannot be accommodated. Taking a 256 KB FLASH storage space for example, starting from the first address, the first 32 KB space is assigned to the BOOTLOADER, and the remaining 224 KB space is assigned to the APP. When FOTA upgrading is carried out for the Tbox, the MODEM first updates its own version, and then performs version upgrading to the MCU via a serial port after successfully upgrading its own version, so as to finally complete version upgrading of the whole device. The upgrading process is shown in FIG. 3.

According to actual measurement, a total time length of MCU upgrading is about 20 seconds. According to the size ratio of partitions, it can be concluded that a time length of BOOTLOADER upgrading is about 2.5 seconds. If circumstances including abnormal power failure, device restarting, and so on occur during this period, it would result in the device' failure to start up.

SUMMARY OF THE INVENTION

The technical problem to be solved by the solutions provided according to embodiments of the present disclosure is a risk that a device fails to start up due to abnormal interruption, such as abnormal power failure, device restarting, and so on, during a process of BOOTLOADER upgrading.

A method for upgrading a vehicle-mounted Tbox according to an embodiment of the present disclosure includes steps of: determining, by the vehicle-mounted Tbox, when using a BOOTLOADER1 module that is used to store a power-on initial code for power-on startup, whether version upgrading needs to be carried out; and carrying out, by the vehicle-mounted Tbox, when it is determined that version upgrading needs to be carried out, sequentially version upgrading on a BOOTLOADER2 module for storing control logic and a diagnostic protocol stack code and an APP module.

An apparatus for upgrading a vehicle-mounted Tbox according to an embodiment of the present disclosure comprises: a determining module for determining whether version upgrading needs to be carried out when a BOOTLOADER1 module that is used to store a power-on initial code is used for power-on startup; and an upgrading module for sequentially carrying out version upgrading on a BOOTLOADER2 module for storing control logic and a diagnostic protocol stack code and an APP module when it is determined that version upgrading needs to be carried out.

A device for upgrading a vehicle-mounted Tbox according to an embodiment of the present disclosure comprises a processor and a memory coupled to the processor. The memory stores programs for upgrading a vehicle-mounted Tbox that can be run on the processor, and the programs for upgrading a vehicle-mounted Tbox, when executed by the processor, implement steps of the method for upgrading a vehicle-mounted Tbox according to an embodiment of the present disclosure.

A storage medium according to an embodiment of the present disclosure stores programs for upgrading a vehicle-mounted Tbox, and the programs for upgrading a vehicle-mounted Tbox, when executed by a processor, implement steps of the method for upgrading a vehicle-mounted Tbox according to an embodiment of the present disclosure.

BRIEF DESCRIPTION OF THE DRAWINGS

The accompanying drawings illustrated are used for better understanding of the present disclosure, and constitute part of the present disclosure. Exemplary embodiments and description thereof are provided for understanding the present disclosure, and do not constitute improper limitation to the present disclosure. In the drawings:

FIG. 3 is a flowchart of software upgrading and startup of a vehicle-mounted Tbox.

FIG. 4 is a flowchart of a method for upgrading a vehicle-mounted Tbox provided in an embodiment of the present disclosure;

DETAILED DESCRIPTION OF THE EMBODIMENTS

Figure 1:
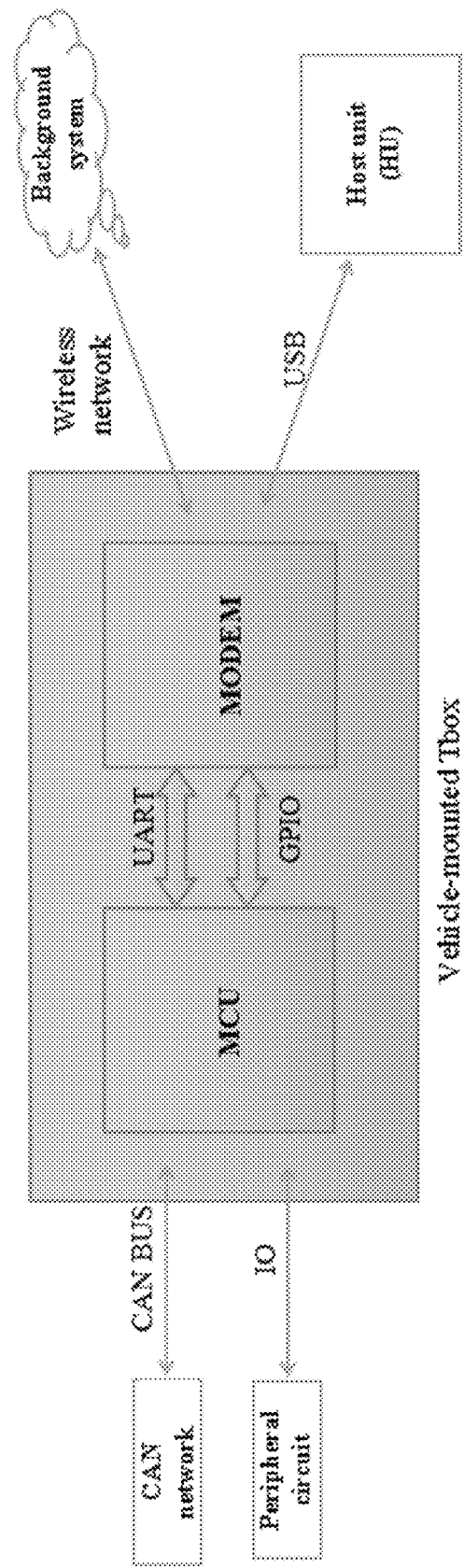
FIG. 1 is a diagram of a system for upgrading a vehicle-mounted Tbox provided in some circumstances.
Figure 2:
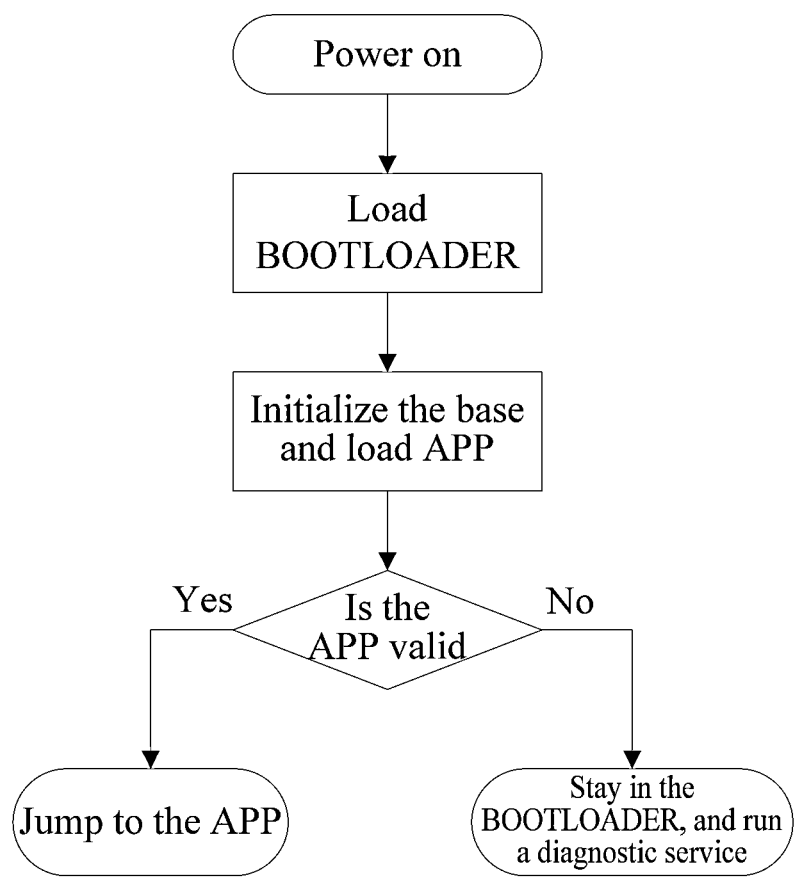
FIG. 2 is a flowchart of MCU version upgrading provided in some circumstances.

Preferred embodiments of the present disclosure will be described in detail with reference to the accompanying drawings. It should be understood that, the following preferred embodiments described are only used to describe and explain the present disclosure, rather than to limit the present disclosure.

FIG. 4 is a flowchart of a method for upgrading a vehicle-mounted Tbox provided in an embodiment of the present disclosure. As shown in FIG. 4, the method includes the following steps. At step S401, when using a BOOTLOADER1 module that is used to store a power-on initial code for power-on startup, a vehicle-mounted Tbox determines whether version upgrading needs to be carried out. At step S402, when it is determined that version upgrading needs to be carried out, the vehicle-mounted Tbox sequentially carries out version upgrading on a BOOTLOADER2 module for storing control logic and a diagnostic protocol stack code and an APP module.

In an embodiment, after the vehicle-mounted Tbox carries out version upgrading on the BOOTLOADER2 module and the APP module, the method further includes the following steps: the vehicle-mounted Tbox detects whether upgrading succeeds; and when it is detected that upgrading fails, the vehicle-mounted Tbox further detects a position where upgrading fails and performs upgrading failure repairing according to the position where upgrading fails.

In an embodiment, the step that the vehicle-mounted Tbox further detects the position where upgrading fails and performs upgrading failure repairing according to the position where upgrading fails includes the following steps: the vehicle-mounted Tbox determines, by reading a state of GPIO1 and GPIO2, whether the position where upgrading fails is located in the BOOTLOADER2 module or the APP module. When it is determined that the position where upgrading fails is located in the BOOTLOADER2 module, the vehicle-mounted Tbox sequentially carries out version upgrading on the BOOTLOADER2 module and the APP module. When it is determined that the position where upgrading fails is located in the APP module, the vehicle-mounted Tbox carries out version upgrading on the APP module. The GPIO1 refers to general purpose input/output 1, and the GPIO2 refers to general purpose input/output 2.

In the present embodiment, the GPIO1 and the GPIO2 are used as FLAG indications so as to inform the MODEM of the position where upgrading fails.

In an embodiment, the step that the vehicle-mounted Tbox determines, by reading a state of GPIO1 and GPIO2, whether the position where upgrading fails is located in the BOOTLOADER2 module or the APP module includes the following steps: when the state of the GPIO1 and the GPIO2 is (0, 1), the vehicle-mounted Tbox determines that the position where upgrading fails is located in the BOOTLOADER2 module, and when the state of the GPIO1 and the GPIO2 is (1, 0), the vehicle-mounted Tbox determines that the position where upgrading fails is located in the APP module; or when the state of the GPIO1 and the GPIO2 is (1, 0), the vehicle-mounted Tbox determines that the position where upgrading fails is located in the BOOTLOADER2 module, and when the state of the GPIO1 and the GPIO2 is (0, 1), the vehicle-mounted Tbox determines that the position where upgrading fails is located in the APP module.

Figure 5:
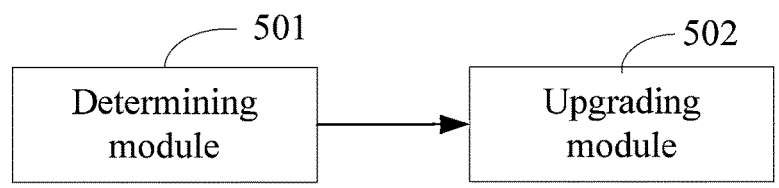
FIG. 5 is a schematic diagram of an apparatus for upgrading a vehicle-mounted Tbox provided in an embodiment of the present disclosure.

FIG. 5 is a schematic diagram of an apparatus for upgrading a vehicle-mounted Tbox provided in an embodiment of the present disclosure. As shown in FIG. 5, the apparatus includes a determining module 501 and an upgrading module 502.

The determining module 501 is used to determine whether version upgrading needs to be carried out when a BOOTLOADER1 module that is used to store a power-on initial code is used for power-on startup. The upgrading module 502 is used to sequentially carry out version upgrading on a BOOTLOADER2 module for storing control logic and a diagnostic protocol stack code and an APP module when it is determined that version upgrading needs to be carried out.

In the present embodiment, the apparatus further includes an upgrading failure repairing module. The upgrading failure repairing module is used to detect whether upgrading succeeds. If it is detected that upgrading fails, the module is further used to detect a position where upgrading fails and perform upgrading failure repairing according to the position where upgrading fails.

In an embodiment, the upgrading failure repairing module includes: a determining unit, which is used to determine, by reading a state of GPIO1 and GPIO2, whether the position where upgrading fails is located in the BOOTLOADER2 module or the APP module; and an upgrading failure repairing unit, which is used to sequentially carry out version upgrading on the BOOTLOADER2 module and the APP module when it is determined that the position where upgrading fails is located in the BOOTLOADER2 module, and is used to carry out version upgrading on the APP module when it is determined that the position where upgrading fails is located in the APP module. The determining unit is used to determine that the position where upgrading fails is located in the BOOTLOADER2 module when the state of the GPIO1 and the GPIO2 is (0, 1), and the vehicle-mounted Tbox determines that the position where upgrading fails is located in the APP module when the state of the GPIO1 and the GPIO2 is (1, 0); or the determining unit is used to determine that the position where upgrading fails is located in the BOOTLOADER2 module when the state of the GPIO1 and the GPIO2 is (1, 0), and the vehicle-mounted Tbox determines that the position where upgrading fails is located in the APP module when the state of the GPIO1 and the GPIO2 is (0, 1).

According to an embodiment of the present disclosure, a device for upgrading a vehicle-mounted Tbox is provided. The device includes a processor and a memory coupled to the processor. The memory stores programs for upgrading a vehicle-mounted Tbox that can be run on the processor. The programs for upgrading a vehicle-mounted Tbox, when executed by the processor, implement steps of the method for upgrading a vehicle-mounted Tbox provided according to an embodiment of the present disclosure.

According to an embodiment of the present disclosure, a storage medium is provided. The storage medium stores programs for upgrading a vehicle-mounted Tbox. The programs for upgrading a vehicle-mounted Tbox, when executed by a processor, implement steps of the method for upgrading a vehicle-mounted Tbox provided according to an embodiment of the present disclosure.

In view of the risk that a device fails to start up due to upgrading in existing solutions, by optimizing the existing software architecture of the MCU, the conventional manner of BOOTLOADER+APP is split into a manner of BOOTLOADER1+BOOTLOADER2+APP. The BOOTLOADER1 only stores a power-on initialization code, and the BOOTLOADER2 only stores remaining control logic and diagnostic protocol stack. That is, the BOOTLOADER1 is only in charge of power-on startup, and a software portion has a most simplified code and requires no maintenance. In this way, version upgrading may start from the BOOTLOADER2, and the BOOTLOADER1 is free from damage whether abnormal interruption occurs or not during upgrading. When power-on startup is performed again, an upgrading process can be restarted again, so as to avoid the circumstance that a device fails to start up due to upgrading and improve reliability of a Tbox product.

Since the power-on initialization code is simple and constant, it basically requires no upgrading. In an optimized version upgrading solution, upgrading starts from the BOOTLOADER2. Even if upgrading fails due to abnormal termination during an upgrading process of the BOOTLOADER2, after powering off and restarting, the BOOTLOADER1 still can ensure that the Tbox can normally start up. After the MODEM starts up, the MODEM may detect that a prior upgrading process of the MCU fails, and re-initiates an upgrading action until upgrading of the MCU is completed.

Figure 6:
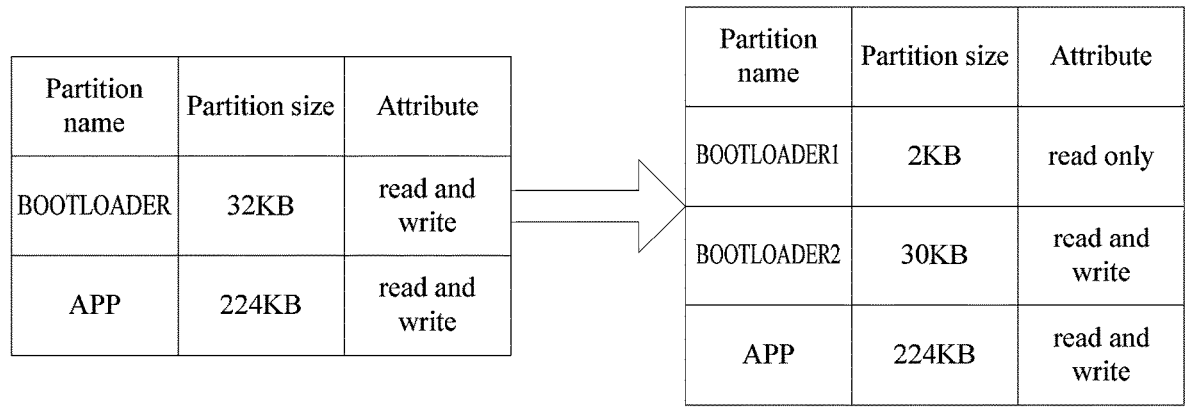
FIG. 6 is a schematic diagram showing comparison of new and old MEMORY MAPs provided in an embodiment of the present disclosure.

The storage space is optimally configured. An improved MCU software architecture includes three stages, i.e., BOOTLOADER1+BOOTLOADER2+APP. The BOOTLOADER1 only includes a power-on guiding code, and only requires a 2 KB space. The remaining space is assigned to the BOOTLOADER2+APP. Therefore, a new FLASH assignment manner is as follow: starting from the first address, 2 KB is assigned for the BOOTLOADER1; 30 KB is assigned for the BOOTLOADER2; and 224 KB is assigned for the APP. Comparison of new and old MEMORY MAPs is shown in FIG. 6.

Figure 7:
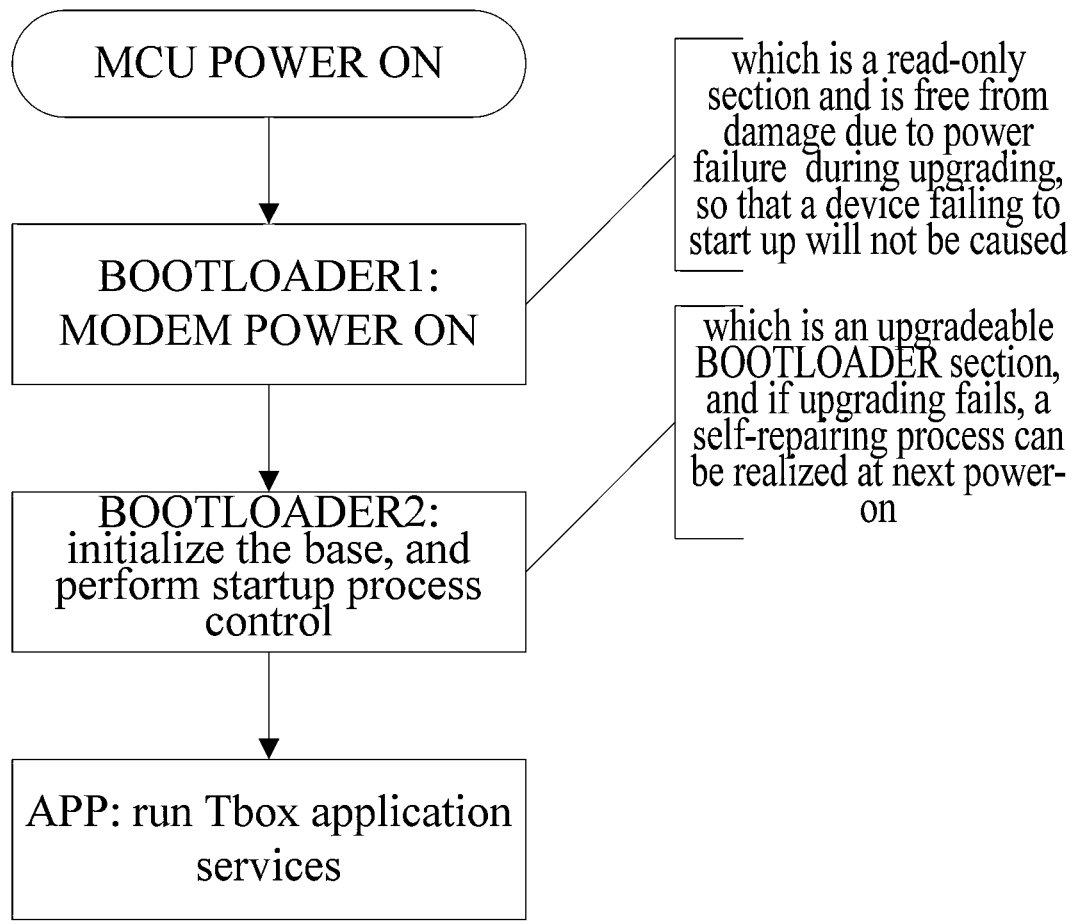
FIG. 7 is a flowchart of MCU startup provided in an embodiment of the present disclosure.

FIG. 7 is a flowchart of MCU startup provided in an embodiment of the present disclosure. As shown in FIG. 7, since the new architecture adopts two stages of BOOTLOADER for startup, a startup process of the MCU is adjusted correspondingly. The BOOTLOADER1 stage is a read-only section, which ensures that the device can still carry out a self-repairing upgrading process at the next power-on and ensures that the device do not fail to start up due to upgrading. Details are as follows.
- 701) Power-on startup is performed, and the MCU loads a BOOTLOADER1 image and controls the MODEM to start up.
- 702) The process jumps to the BOOTLOADER2 which performs initiation of base resources and performs startup process control.
- 703) The process jumps to the APP which runs Tbox application services.

Figure 8:
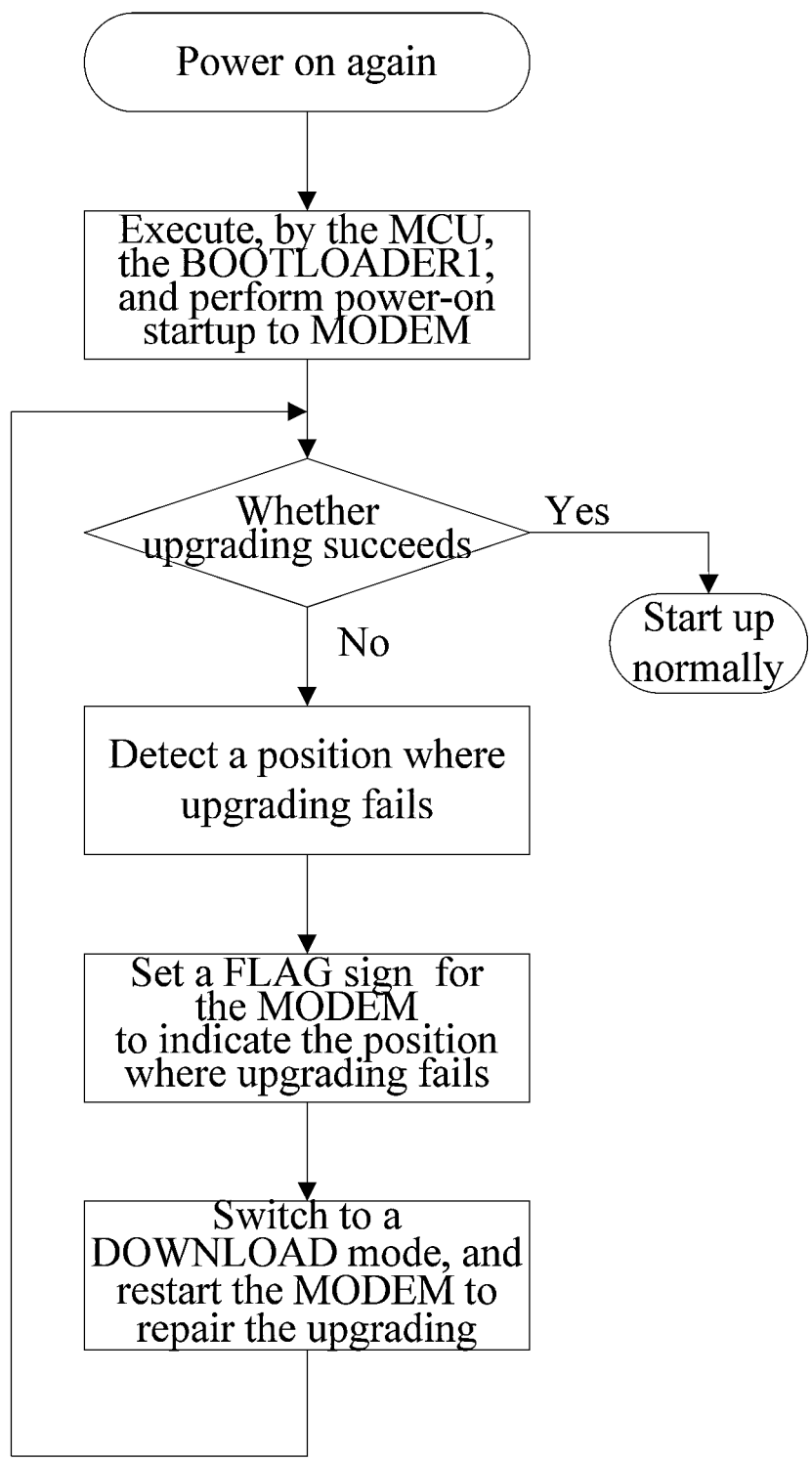
FIG. 8 is a flowchart of MCU self-repairing after power failure during upgrading provided in an embodiment of the present disclosure.

FIG. 8 is a flowchart of MCU self-repairing after power failure during upgrading provided in an embodiment of the present disclosure. As shown in FIG. 8, in the new software architecture, after upgrading is interrupted due to abnormal power failure during an upgrading process, the Tbox automatically detects a prior upgrading failure after being powered on again and initiates a self-repairing process. No human interference is required in the whole process. The process is as follows.
- 801) Power-on startup is performed, and the MCU loads a BOOTLOADER1 image and instantly performs power-on startup to the MODEM.
- 802) An upgrading sign is read for determining whether the previous upgrading succeeds.
- 803) If upgrading succeeds, a normal startup process is performed; and if upgrading fails, detecting a position where upgrading fails is performed.
- 804) In a case that upgrading fails and communication cannot be established, the MCU informs the MODEM of the position where upgrading fails by using GPIO to make a FLAG indication.
- 805) The MCU switches to a DOWNLOAD mode, and wait for restarting of the MODEM to repair the upgrading process.

Figure 9:
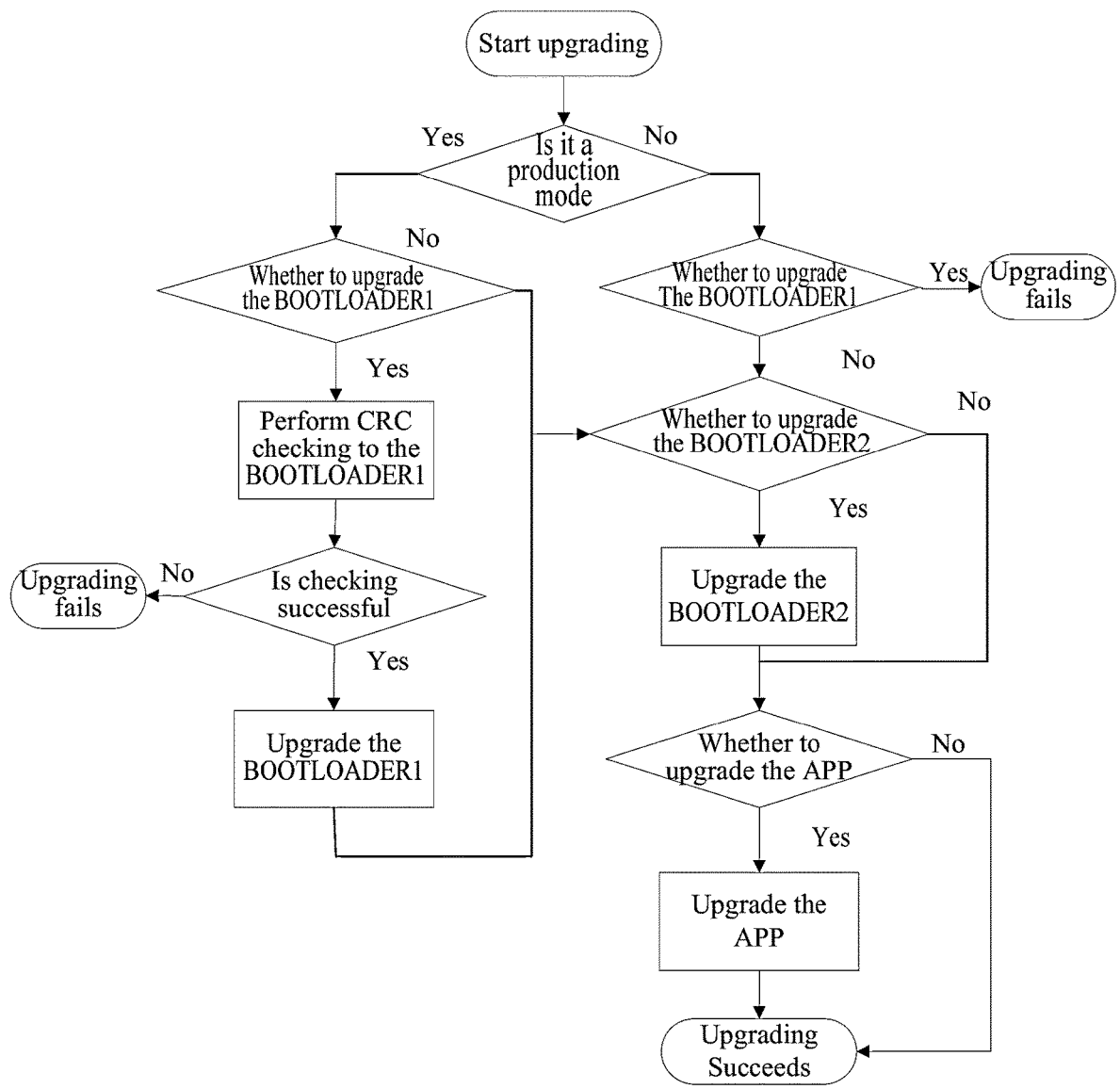
FIG. 9 is a flowchart of MCU upgrading provided in an embodiment of the present disclosure.

FIG. 9 is a flowchart of MCU upgrading provided in an embodiment of the present disclosure. As shown in FIG. 9, in the new solution, a BOOTLOADER1 partition is a guiding program for power-on startup of the device, and thus there is a relative high demand for the reliability of the partition. Except being produced in the production line, it is forbidden to rewrite this section in other scenarios. In addition, a set of CRC checking algorithms are added, to ensure accuracy of the BOOTLOADER1 image and avoid the risk that a device fails to start up due to image abnormity during upgrading. The process includes the following steps.
- 901) When upgrading starts, it is determined whether the device is in a production mode.
- 902) If the device is in the production mode and the BOOTLOADER1 needs to be ungraded, the CRC algorithms are used to check an upgrade packet so as to complete upgrading. After the upgrading of the BOOTLOADER1 succeeds, the BOOTLOADER2 and the APP module are upgraded respectively.
- 903) If the device is in a user mode, it is forbidden to upgrade the BOOTLOADER1. At this time, any upgrading to the BOOTLOADER1 section directly reports an error and terminates, and only the BOOTLOADER2 and the APP are upgraded.

Figure 10:
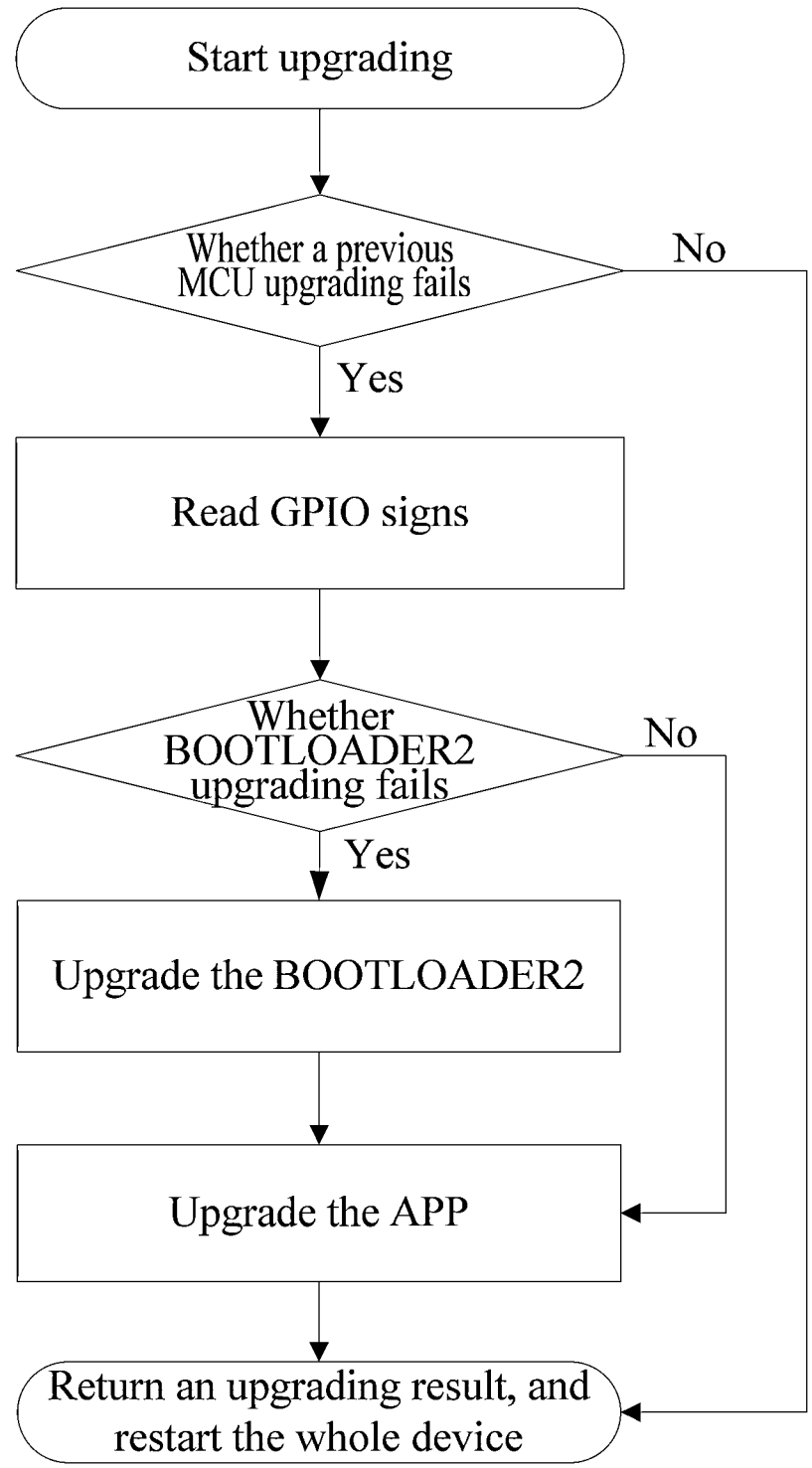
FIG. 10 is a flowchart of repairing after MCU upgrading fails provided in an embodiment of the present disclosure.

FIG. 10 is a flowchart of repairing after MCU upgrading fails provided in an embodiment of the present disclosure.

As shown in FIG. 10, two signs, i.e., GPIO1 and GPIO2 are added in the MCU startup process. The two signs serve to indicate a current startup state of the MCU for the MODEM. When a circumstance that upgrading of the MCU fails occurs, after the MODEM starts up, the MODEM can determine a position where upgrading fails through the two signs and restart the upgrading process.

1001) Upgrading begins.

1002) It is determined whether the previous upgrading fails, and if the previous upgrading fails, a state of GPIO1 and GPIO2 is determined so as to determine a starting address for upgrading.

When the state of the GPIO1 and the GPIO2 is (0, 1), it is determined that the position in the MCU where upgrading fails is located in the BOOTLOADER2 module, and when the state of the GPIO1 and the GPIO2 is (1, 0), it is determined that the position in the MCU where upgrading fails is located in the APP module; or when the state of the GPIO1 and the GPIO2 is (1, 0), it is determined that the position in the MCU where upgrading fails is located in the BOOTLOADER2 module, and when the state of the GPIO1 and the GPIO2 is (0, 1), it is determined that the position in the MCU where upgrading fails is located in the APP module.

1003) The MODEM restarts the MCU, and enters an ISP upgrading mode.

1004) The MODEM runs an upgrading script to start upgrading.

1005) An upgrading result is returned, and the whole device is restarted.

According to the solution provided in the present disclosure, the conventional manner of BOOTLOADER+APP is split into a manner of BOOTLOADER1+BOOTLOADER2+APP. The BOOTLOADER1 only stores a power-on initialization code, and the BOOTLOADER2 only stores remaining control logic and diagnostic protocol stack. That is, the BOOTLOADER1 is only in charge of power-on startup, and a software portion has a most simplified code and requires no maintenance. Version upgrading starts from the BOOTLOADER2, and the BOOTLOADER1 is free from damage whether abnormal interruption occurs or not during upgrading. In this way, the risk that a device fails to start up due to abnormal operations such as power failure and restarting in an upgrading process can be solved, and reliability and stability of the product can be improved.

According to the solutions provided in the present disclosure, in the scenario of TBOX FOTA upgrading, the existing MCU software architecture and upgrading solution are optimized, which solves the risk that a device fails to start up due to BOOTLOADER upgrading and increases maintainability and reliability of the product.

Although the present disclosure has been described in detail above, the present disclosure is not limited thereto, and those skilled in the art can make various modifications according to the principles of the present disclosure. Therefore, all modifications made in accordance with the principles of the present disclosure should be understood as falling within the protection scope of the present disclosure.

The invention claimed is:

1. A method for upgrading a vehicle-mounted Tbox, comprising:
   determining, by the vehicle-mounted Tbox, when using a BOOTLOADER 1 module that is used to store a power-on initial code for power-on startup, whether version upgrading needs to be carried out;
   carrying out, by the vehicle-mounted Tbox, when it is determined that version upgrading needs to be carried out, sequentially version upgrading on a BOOTLOADER2 module for storing control logic and a diagnostic protocol stack code and an APP module, wherein the Tbox refers to a telematics box; and then
   detecting, by the vehicle-mounted Tbox, when it is detected that upgrading fails, a position where upgrading fails and performing upgrading failure repairing according to the position where upgrading fails, comprising;
   determining, by the vehicle-mounted Tbox, by reading a state of GPIO1 and GPIO2, whether the position where upgrading fails is located in the BOOTLOADER2 module or the APP module;
   carrying out, by the vehicle-mounted Tbox, when it is determined that the position where upgrading fails is located in the BOOTLOADER2 module, sequentially version upgrading on the BOOTLOADER2 module and the APP module; and
   carrying out, by the vehicle-mounted Tbox, when it is determined that the position where upgrading fails is located in the APP module, version upgrading on the APP module,
   wherein the GPIO1 refers to general purpose input/output 1, and the GPIO2 refers to general purpose input/output 2.

2. The method according to claim 1, wherein after carrying out, by the vehicle-mounted Tbox, version upgrading on the BOOTLOADER 2 module and the APP module, the method further comprises:
   detecting, by the vehicle-mounted Tbox, whether upgrading succeeds.

3. The method according to claim 1, wherein determining, by the vehicle-mounted Tbox, by reading a state of GPIO1 and GPIO2, whether the position where upgrading fails is located in the BOOTLOADER2 module or the APP module comprises:
   determining, by the vehicle-mounted Tbox, when the state of the GPIO1 and the GPIO2 is (0, 1), that the position where upgrading fails is located in the BOOTLOADER 2 module, and determining, by the vehicle-mounted Tbox, when the state of the GPIO1 and the GPIO2 is (1, 0), that the position where upgrading fails is located in the APP module; or
   determining, by the vehicle-mounted Tbox, when the state of the GPIO1 and the GPIO2 is (1, 0), that the position where upgrading fails is located in the BOOTLOADER2 module, and determining, by the vehicle-mounted Tbox, when the state of the GPIO1 and the GPIO2 is (0, 1), that the position where upgrading fails is located in the APP module.

4. An apparatus for upgrading a vehicle-mounted Tbox, comprising:
   a determining module, for determining whether version upgrading needs to be carried out when a BOOTLOADER1 module that is used to store a power-on initial code is used for power-on startup;
   an upgrading module, for sequentially carrying out version upgrading on a BOOTLOADER2 module for storing control logic and a diagnostic protocol stack code and an APP module when it is determined that version upgrading needs to be carried out, wherein the Tbox refers to a telematics box.; and
   an upgrading failure repairing module for detecting a position where upgrading fails and performing upgrading failure repairing according to the position where upgrading fails when it is detected that upgrading fails, wherein the upgrading failure repairing module comprises;

a determining unit for determining, by reading a state of GPIO1 and GPIO2, whether the position where upgrading fails is located in the BOOTLOADER2 module or the APP module; and an upgrading failure repairing unit for sequentially carrying out version upgrading on the BOOTLOADER2 module and the APP module when it is determined that the position where upgrading fails is located in the BOOTLOADER2 module, and carrying out version upgrading on the APP module when it is determined that the position where upgrading fails is located in the APP module, wherein the GPIO1 refers to general purpose input/output 1, and the GPIO2 refers to general purpose input/output 2.

5. The apparatus according to claim 4, wherein the upgrading failure repairing module detects whether upgrading succeeds.

6. The apparatus according to claim 4, wherein the determining unit is used to determine that the position where upgrading fails is located in the BOOTLOADER2 module when the state of the GPIO1 and the GPIO2 is (0, 1), and the vehicle-mounted Tbox determines that the position where upgrading fails is located in the APP module when the state of the GPIO1 and the GPIO2 is (1, 0); or the determining unit is used to determine that the position where upgrading fails is located in the BOOTLOADER2 module when the state of the GPIO1 and the GPIO2 is (1, 0), and the vehicle-mounted Tbox determines that the position where upgrading fails is located in the APP module when the state of the GPIO1 and the GPIO2 is (0, 1).

7. A device for upgrading a vehicle-mounted Tbox, wherein the device comprises a processor and a memory coupled to the processor, wherein the memory stores programs for upgrading a vehicle-mounted Tbox that can be run on the processor, and the programs for upgrading a vehicle-mounted Tbox, when executed by the processor, implement steps of the method for upgrading a vehicle-mounted Tbox according to claim 1.

\* \* \* \* \*